United States Patent
Cohen et al.

(10) Patent No.: US 6,976,792 B1
(45) Date of Patent: Dec. 20, 2005

(54) OPTICAL FIBER SPACE TRANSFORMATION

(75) Inventors: Mitchell S. Cohen, Yorktown Heights, NY (US); David P. Gaio, Rochester, MN (US); William K. Hogan, Rochester, MN (US); Jeannine M. Trewhella, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 09/670,250

(22) Filed: Sep. 26, 2000

(51) Int. Cl.[7] .......................... G02B 6/42; C03B 37/075
(52) U.S. Cl. ............................ 385/88; 385/89; 385/92; 385/129; 65/402
(58) Field of Search .............................. 385/32, 50, 51, 385/88–91, 136, 137, 129–132; 65/386, 402

(56) References Cited

U.S. PATENT DOCUMENTS

| | | | |
|---|---|---|---|
| 4,812,001 A * | 3/1989 | Tomita et al. ............... 385/123 |
| 4,856,864 A * | 8/1989 | Campbell et al. ............. 385/48 |
| 5,015,059 A | 5/1991 | Booth et al. |
| 5,299,276 A | 3/1994 | Okamura et al. |
| 5,333,225 A | 7/1994 | Jacobowitz et al. |
| 5,596,661 A | 1/1997 | Henry et al. |
| 5,611,014 A | 3/1997 | Basavanhally |
| 5,671,316 A | 9/1997 | Yuhara et al. |
| 5,679,291 A | 10/1997 | Hakogi |
| 5,699,461 A * | 12/1997 | Minemoto et al. ............ 385/12 |
| 5,703,973 A | 12/1997 | Mettler et al. |
| 5,768,452 A | 6/1998 | Atkins et al. |
| 5,818,990 A | 10/1998 | Steijer et al. |
| 5,835,659 A * | 11/1998 | Ota et al. ................... 385/137 |
| 5,853,626 A | 12/1998 | Kato |
| 5,854,868 A * | 12/1998 | Yoshimura et al. ........... 385/14 |
| 5,883,988 A | 3/1999 | Yamamoto et al. |
| 5,913,002 A | 6/1999 | Jiang |
| 5,974,214 A | 10/1999 | Shacklette et al. |
| 5,991,492 A | 11/1999 | Ota et al. |
| 6,003,222 A | 12/1999 | Barbarossa |
| 6,314,219 B1 * | 11/2001 | Zhang et al. ................. 385/32 |
| 6,625,371 B1 * | 9/2003 | Rogers et al. ............... 385/132 |
| 2001/0024547 A1 * | 9/2001 | Huang et al. ................. 385/32 |

FOREIGN PATENT DOCUMENTS

| | | |
|---|---|---|
| EP | 0301840 | 2/1989 |
| JP | 08122583 | 5/1996 |
| WO | WO91/20007 | 12/1991 |

OTHER PUBLICATIONS

Sunaga et al., "2 Gbit/s Form Factor Fiber-optic Transceiver for Single Mode Optical Fiber", Hitachi Cable, Ltd., Optoelectronic System Laboratory.

"Process Enhancement for Planar Processed Silica Glass Wageguide Consolidation in the Presence of Metal Lines for Optoelectronic Integrated Packaging", IBM Technical Disclosure Bulletin, pp. 357-359, Oct. 1991.

* cited by examiner

Primary Examiner—Rodney Bovernick
Assistant Examiner—Omar Rojas
(74) Attorney, Agent, or Firm—Ference & Associates

(57) ABSTRACT

Methods and arrangements for providing compact optical paths between an optical connector, such as an MTRJ connector, and optoelectronic chips contained in TO cans. The methods and arrangements employed for creating the optical paths include the use of fibers that are not prone to fail from bending stresses, or waveguides.

18 Claims, 2 Drawing Sheets

OPTICAL FIBER SPACE TRANSFORMATION

FIELD OF THE INVENTION

The present invention generally relates to a method for providing an optical path in the optical subassemblies used in optoelectronic transceivers.

BACKGROUND OF THE INVENTION

The optoelectronics industry has made a recent decision to reduce the size of the optical connectors previously used, e.g. the SC connector, to roughly half the size, with corresponding reductions in the size of the transceiver module which mate to the connector. Such a transceiver would mate to an optical connector carrying two fibers, one which carried the outgoing signals from the transmitter, and the other which carried the incoming signals to the receiver. The connectors and transceivers made in accordance with this decision are called "Small Form Factor" (SFF) components. The space allotted to the optoelectronic and supporting chips, circuits and electrical connections, along with the mating optoelectronic interconnection, is typically only about 13 mm×49.5 mm in the plane, and 9.8 mm high. This requirement puts stringent constraints on the design of the transceiver, particularly because the components packaged within this small space must meet the operating specifications while low fabrication costs are maintained.

Two major complicating factors in the development of transceivers are the facts that:

no one optical connector has been chosen as the SFF standard. Major contenders for such connectors include the LC, the MTRJ, the VF45, and the SCDC. For a discussion of the various connectors used with SFF (see J. M. Trewhella, "Performance Comparison of Small Form Factor Fiber Optic Connectors", Proceedings of 49th ECTC, pp. 398–407, 1999) and most of the optoelectronic chips (laser and receiver) used in the industry are hermetically sealed in TO cans. The use of these cans presents extra packaging challenges because they are large and awkward on the SFF scale, and are typically made with very wide tolerances.

The fabrication of a transceiver which mates to the LC connector has been described previously (W. Hogan, "A Novel Low-Cost Small-Form-Factor Transceiver Module", Proc. $50^{th}$ ECTC, pp. 725–732, 2000). However, the packaging problem associated with the LC connector is simpler with than that of any other connector, primarily because of the LC's relatively wide fiber-to-fiber spacing (transmitter fiber to receiver fiber) in the connector, i.e. 6.25 mm, which permits the TO cans to be positioned side by side. No such solution is viable for the MTRJ connector, because that connector has a fiber—fiber spacing of only 750 micrometer, while the width of a TO46 can is about 5.4 mm. Clearly, an optical space transform must be made for the MTRJ connector in order to change the 750 micrometer lateral spacing into a spacing compatible with the use of TO cans.

In the past, several optoelectronic devices have been built with waveguides constructed by embedding standard optical fibers in the devices, as well as with non-fiber waveguides specially constructed on the device itself. Either technique for waveguide construction may be used for fabricating a transceiver which mates to an MTRJ connector. In particular, a silicon substrate positioned in the transceiver may be used as the carrier of an "optical coupler" (OC) which serves to interconnect the fibers in a cable terminated by an MTRJ connector to the optoelectronic chips (laser and photodetector). This optical coupler supports the waveguides which are used for the optical interconnect.

In particular, V-shaped grooves are precision-etched in silicon to carry two optical fibers using known silicon-optical bench (SiOB) techniques, one each for the transmitter and receiver functions, while larger grooves are simultaneously etched to carry the 750 micrometer diameter pins needed for interfacing to the MTRJ connector. The fibers are anchored to the Si carrier by means of epoxy; the ends of the assembly are then polished to provide the finish required by the fiber faces.

However, because of severe space limitations, the required space transform must be confined to a very short longitudinal distance, which consequently requires that the fibers be subjected to a very small bend radius. Small fiber bend radii are usually unacceptable, however, since extensive studies have shown fiber failure under conditions of small bend radius because of stress-induced cracking (see V. Annovazzi-Lodi et al, "Statistical Analysis of Fiber Failures under Bending-Stress Fatigue", J. Lightwave Tech., vol. 15, pp. 288–293, 1997).

In view of the foregoing, a need has been recognized, inter alia, in connection with overcoming the shortcomings and disadvantages encountered in connection with the conventional arrangements discussed above.

SUMMARY OF THE INVENTION

In accordance with at least one presently preferred embodiment of the present invention, novel features based on silicon-optical bench (SiOB) technology are contemplated in order to achieve reliable, low-cost optical couplers suitable for use with an MTRJ connector. Particularly, whereas the anchoring of fibers in a SiOB is known, the present invention broadly contemplates the imposition of bends in each fiber, and in a manner that avoids the risk of fiber failure. Also contemplated herein is the use of waveguides instead of fibers.

At least one embodiment of the present invention provides an apparatus for guiding at least one optical path for an optoelectronic transceiver, the apparatus comprising: an input interface; an output interface; and at least one bent element being disposed between the input and output interfaces; the at least one bent element being adapted to provide at least one optical path; the at least one bent element being adapted to avoid premature mechanical failure.

Further, at least one embodiment of the present invention provides a method of forming apparatus for guiding at least one optical path for an optoelectronic transceiver, the method comprising the steps of: providing an input interface; providing an output interface; disposing at least one bent element between the input and output interfaces; adapting the at least one bent element to provide at least one optical path; and adapting the at least one bent element to avoid premature mechanical failure.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Some of the terminology utilized throughout this disclosure, as well as some pertinent background concepts, are described in detail in commonly assigned and copending U.S. patent application Ser. No. 09/348,955, filed Jul. 7, 1999, entitled "Small Form Factor Optoelectronic Transceivers", and which is hereby fully incorporated by reference as if set forth in its entirety herein.

Figure 1A:
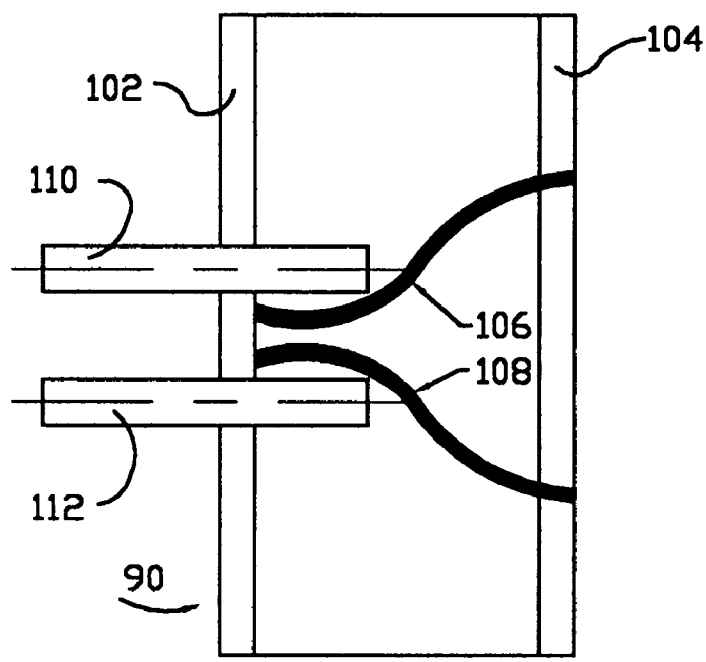
FIGS. 1a and 1b illustrate side and frontal views, respectively, of an optical coupler.
Figure 1B:
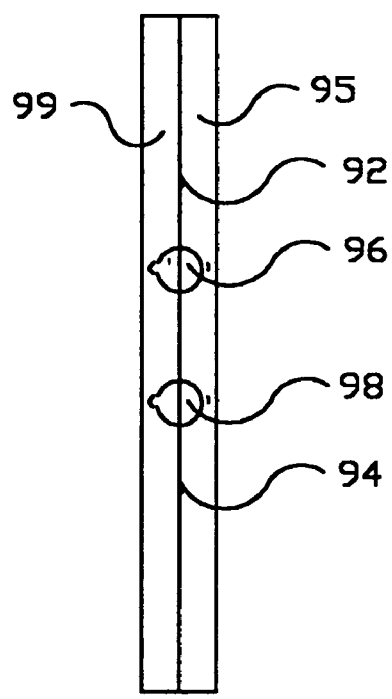

FIGS. 1a and 1b illustrate an optical coupler (90) and convey two different concepts according to an embodiment of the present invention. Particularly, as discussed below, the components indicated at 106, 108 may be considered to be either fibers or waveguides.

As shown in FIGS. 1a and 1b, V-shaped grooves 92, 94, are preferably precision etched in a silicon base 95 to carry two fibers 106, 108. The etching is preferably undertaken using known SiOB techniques. One fiber each is preferably provided for the transmitter and receiver functions, while larger grooves 96, 98 are simultaneously etched in the base 95 and interfacing cover 99 to carry the pins 110, 112 (such as typically used for interfacing to the MTRJ connector).

Preferably, the precision V grooves (92, 94, 96, 98) are etched only in narrow plateaus 102, 104 in the base of the OC, so that each fiber is anchored only at each end, and is free to take an S-shaped curve between the anchor points. To achieve this shape, the following procedure can be employed:
1. Using an appropriately configured jig, the fibers 106, 108, with the buffer fully intact, are aligned with their anchoring grooves in the base of the OC.
2. The (preferably) Si cover 99 is clamped to the base 95, thereby temporarily but firmly holding the fibers 106, 108 in place.
3. The assembly is baked in an oven in air at 1000–1100° C. for about 15 min.
4. The protruding portions of the fibers 106, 108 are cut if necessary, then the faces of the OC 90 are polished.
5. The metal MTRJ guide pins 110, 112 are inserted and epoxied in place. If desired, the fibers 106, 108 may also be potted in epoxy.

With the exception of the last step, the above operations may preferably be performed in batch mode in order to reduce the cost.

A major innovation is represented by step 3 above. Baking accomplishes several goals:

☒The stress in the fiber is relieved, so the short bend radii (e.g., 2.5 mm) are achieved under strain-free conditions.

☒The buffer layer is burned off, leaving clean, bare fiber.

☒The fibers are anchored to the base and cover by the well known SiO2 sintering technique used for wafer—wafer bonding.

☒The cover and base of the OC are simultaneously sintered together.

It is possible to position the two TO cans containing the laser and receiver chips side by side, adjacent fiber anchor 104, if an optical coupler such as that described above is used. Of course, a lens should be positioned between the end of each fiber and its corresponding TO can in order to transfer the light efficiently between the optoelectronic chip in the can and the fiber end.

Another embodiment of the present invention, also conveyed by the illustration in FIG. 1, is also contemplated, particularly, involving the use of waveguides as components 104, 106 instead of fibers.

Again, a silicon substrate is preferably used with anisotropically etched grooves for the alignment pins for the MTRJ connector. However, the fibers discussed previously are replaced by multimode waveguides (106, 108) having the same S shape shown in FIG. 1, but which are processed in parallel over the entire wafer (e.g., a 200 mm diameter silicon wafer). If waveguides are used, very small bending radii should be attainable (less than the 2.5 mm previously considered for fibers) so that the optical coupler could be shortened, thereby conserving space.

It can be recognized that the difficulty in using a waveguide-based optical coupler lies in finding a reliable, inexpensive fabrication technique which will give low-loss waveguides with reproducible properties, and which will ensure that the waveguides are well aligned to the alignment pins. Another recognizable problem is in finding a path for development of a waveguide-based optical coupler in a short time, which means that technology which is easily accessible must be used.

Various approaches have been used in the past to fabricate multimode waveguides, but these approaches have been found to have drawbacks:
1. Polymer waveguides have been delineated by standard semiconductor processing techniques. See, for example, the polyimide waveguides made by L. Robitaille et al, "Design and fabrication of low-loss polymer waveguide components for on-chip optical interconnection", IEEE Phot. Tech. Lett., vol. 8 pp. 1657–1649, 1996. However, with this technique, it is difficult to fabricate good low-loss waveguides which are more than about 10 micrometer thick and hence suitable for multimode, and it is usually difficult to obtain such waveguides with good sidewall profiles.
2. Molded polymer waveguides have been contemplated (L. J. Norton et al, "Optobus I: A production parallel fiber optical interconnect", Proc. 47th ECTC, pp. 204–209, 1997). The precision molding contemplated therein is very demanding and, it is recognized, would take considerable development effort.
3. Silica waveguides have been fabricated by flame hydrolysis with subsequent reactive-ion etching (RIE) for patterning. However, it has been recognized that multimode-waveguide fabrication is so difficult and expensive that although multimode waveguides have been fabricated in the past, it has been found that such fabrication is generally not economical.
4. A new class of materials known as inorganic-organic photopolymers (ORMOCERs) has recently been used to make waveguides, both single and multimode. M. E. Robertson et al, "O/e-MCM Packaging with new, patternable dielectric and optical materials", Proc. 48th ECTC, pp. 1413–1421, 1998. Fairly vertical walls are achieved because of the photosensitivity of ORMOCERs, and loss values at 850 nm of 0.2 db/cm have been claimed for multimode waveguides. In addition, an MT type connector has been developed for use with such waveguides. This technology may have great promise, however, it is still in the development stage and at this point its practicality is far from assured.

In contrast, in accordance with at least one presently preferred embodiment of the present invention, a waveguide is preferably constructed of a glass core surrounded by polymer cladding. This waveguide structure is fabricated by very straightforward, standard semiconductor-processing techniques.

A key feature of this method is the fabrication of the glass core not by building up the glass, e.g., by flame hydrolysis, but by incorporating a monolithic piece of thin glass into the OC. Such glass has recently been developed and marketed in response to demands by the LCD technology by Schott. Schott D263T glass can be purchased in sheets of 50 micrometer thickness, with standard lateral dimensions of 280 mm×415 mm, has excellent transmission and a refractive index of about 1.53. If thinner waveguides are desired, the glass could be ground and polished after step 3 of the procedure outlined below. While such thin glass can of course be shattered if dropped, its handling is usually surprisingly easy.

Some presently contemplated process steps for fabrication of this version of the optical coupler are:

1. The V grooves 96, 98 (FIG. 1a) for the alignment pins of the MTRJ connector are first etched into the silicon wafer, assumed to be 200 mm in diameter. This step is preferably identical to that previously described for the embedded-fiber OC, except that fiducial marks positioned near the wafer edge are etched simultaneously with the V grooves; these fiducial marks are used for alignment in subsequent masking operations.
2. The thin glass piece is spin coated with a transparent, low-index adhesive to a thickness of 2–5 micrometer, then positioned so the adhesive is in intimate contact with the silicon wafer. This procedure is best carried out in vacuum to avoid entrapment of air.
3. The adhesive is cured, thereby firmly bonding the glass to the silicon. The adhesive layer not only performs the bonding function, but also serves as the cladding on the underside (silicon side) of the waveguide when the coupler is completed.
4. An etch-masking layer is deposited on the glass in such a fashion that the fiducial marks in the silicon are still visible.
5. A photoresist layer is spin coated over the etch-masking layer. A photomask is aligned to the fiducial marks in the silicon wafer, and the photoresist is exposed and developed, then the etch-masking layer is delineated so that a replica of the desired waveguide geometry is produced (see FIG. 1).
6. The waveguide is etched out of the glass sheet with the aid of the patterned etch-masking layer.
7. All photoresist and etch-masking material is removed.
8. Low-refractive-index UV epoxy is flowed over the entire surface in order to form the side and upper cladding layer.
9. A photomask is placed over the wafer for exposure in a standard mask aligner. The mask is open only in the areas immediately surrounding the delineated waveguides. The UV epoxy is exposed, then the uncured epoxy in the regions far from the waveguides is removed with solvent.
10. The optical couplers are diced from the wafer using a standard dicing saw. (Each wafer should yield more than 500 optical couplers). The individual couplers are stacked together for simultaneous polishing of the waveguide faces.

In connection with the above procedure, small-bend radii and hence short couplers with low bending loss are possible because the difference in refractive index between the core and cladding can be made large. Furthermore, the difficult problem of delineating both the waveguides 106, 108 and the V grooves 96, 98 for the pins is solved in a straightforward manner. If a conventional process is used to delineate the waveguides which requires photoresist to be applied after the V grooves are etched, severe nonuniformities in photoresist thickness would be encountered due to streaking effects. On the other hand, if, in a conventional process, the waveguides are delineated before etching the V grooves, the waveguides and their undercladding could be damaged by exposure to the caustic action of the silicon etchant.

The adhesive used in step 2 above could be a thermally cured epoxy, a polyimide, or perhaps the same UV epoxy used in step 8 above. One candidate for the latter might be Luxtrak 4039 from Ablestik, which has a refractive index of 1.455, or alternatively OG134 from Epotek, which has a refractive index of 1.416. The UV epoxy could be cured in a mask aligner in both steps.

An important step in the process described above is the etching of the waveguide, since vertical walls are desired. The preferred procedure would be RIE which is known to give vertical walls. While RIE is notoriously slow for glass, if $C_2F_6$ is used as the reactive gas in this procedure etch rates of 1–2 micrometer/min can be achieved. In this case, photoresist itself could be a good candidate for an etch mask without the use of a separate etch-stop layer, but then a thick photoresist layer would be required because the etch mask would also be eroded away by the RIE. Such a photoresist layer can be made from Dupont's Riston.

Figure 2:
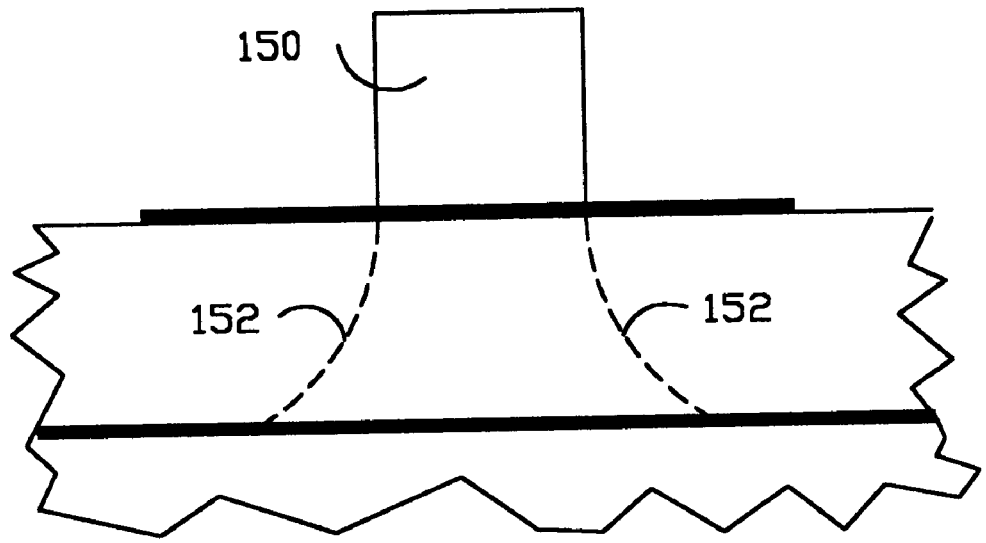
FIG. 2 illustrates a waveguide formed via a wet HF etch.

On the other hand, if for some reason the RIE process is found to be too expensive because of excessive RIE times, the RIE could be combined with a previous isotropic wet etch in warm HF to give fairly straight walls (but not as straight as a pure RIE process). In this case the initial HF etch will undercut the wet-etch-stop and form an undesirable concave waveguide boundary, as illustrated in FIG. 2. (The photoresist is indicated at 150 while the etch profile is indicated, in dotted lines, at 152.)

Figure 3:
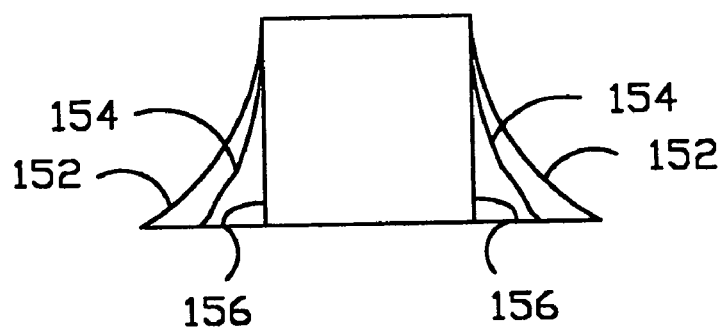
FIG. 3 illustrates a comparison of an improved waveguide profile with both an ideal profile and that contemplated by FIG. 2.

However, if the waveguide is also furnished with an RIE etch-masking layer, and the wet etching is followed by an RIE procedure which removes, for instance, only 10 micrometer vertical depth of the excess "tails" of the glass waveguide, the profile is improved as shown in FIG. 3. Particularly, FIG. 3 shows the improved profile at 154, as contrasted with an "ideal" profile (156) and the undesirably concave profile (152) from FIG. 2. Thus, the use of both wet etch and RIE yields a "compromise" waveguide profile (154) at a reasonable cost.

It is to be understood that, while coupling to an MTRJ connector is emphasized in the present disclosure, various concepts discussed herein may also be applied to other connector types as well.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for guiding at least one optical path for an optoelectronic transceiver, said apparatus comprising:
   an input interface;
   an output interface;
   at least one continuous fiber having a constant core diameter being disposed between said input and output interfaces;
   said at least one continuous fiber being adapted to provide at least one optical path;
   said at least one continuous fiber having at least one bent element being adapted to avoid premature mechanical failure; and
   said at least one bent element comprises at least one optoelectronic fiber,
   wherein adapting said at least one bent element to avoid premature mechanical failure comprises baking said at least one optoelectronic fiber,
   wherein said at least one bent element includes a bending radius of less than about 2.5 mm, and
   wherein said at least one optoelectronic fiber is integrally adhered to said input and output interfaces via baking.

2. The apparatus according to claim 1, wherein said input and output interfaces comprise at least one V-shaped groove which accepts at least one end of at least one said bent element.

3. The apparatus according to claim 1, wherein said at least one bent element comprises one element for providing optoelectronic transmission and one element for providing optoelectronic reception.

4. The apparatus according to claim 1, wherein at least one of said input interface and said output interface comprises silicon.

5. The apparatus according to claim 1, said apparatus comprising a base element and a cover element, said base element and said cover element combining to form said input interface and said output interface.

6. A method of forming apparatus for guiding at least one optical path for an optoelectronic transceiver, said method comprising the steps of providing an input interface;
   providing an output interface;
   disposing at least one continuous fiber having at least one bent element with a constant core diameter between said input and output interfaces;
   adapting said at least one continuous fiber to provide at least one optical path; and
   adapting said at least one bent element to avoid premature mechanical failure,
   wherein said step of providing at least one bent element comprises providing at least one optoelectronic fiber,
   wherein adapting said at least one bent element to avoid premature mechanical failure comprises baking said at least one optoelectronic fiber,
   wherein said at least one bent element includes a bending radius of less than about 2.5 mm and
   wherein said at least one optoelectronic fiber is integrally adhered to said input and output interfaces via baking.

7. The method according to claim 6, wherein said step of baking, related to avoiding premature mechanical failure, comprises baking in an oven in air at between about 1000 and about 1100 degrees Celsius.

8. The method according to claim 7, wherein the duration of said baking step is about 15 minutes.

9. The method according to claim 6, wherein:
   said step of providing at least one optoelectronic fiber comprises providing a buffer layer on said at least one optoelectronic fiber; and
   during said baking step related to avoiding premature mechanical failure, said buffer layer is burned off.

10. The method according to claim 6, wherein:
    at least one of said input interface and said output interface comprises silicon;
    said baking step, related to avoiding premature mechanical failure, comprises anchoring said at least one optoelectronic fiber to at least one of said input interface and said output interface via $SiO_2$ sintering.

11. The method according to claim 6, wherein said steps of providing an input interface and said step of providing an output interface comprise providing a base element and a cover element, said base element and said cover element combining to form said input interface and said output interface.

12. The method according to claim 11, wherein:
    said cover element and said base element comprise silicon;
    said baking step related to avoiding premature mechanical failure, comprises anchoring said cover element and said base element to each other via $SiO_2$ sintering.

13. The method according to claim 6, wherein said disposing step comprises:
    providing at least one V-shaped groove in at least one of said input and output interfaces; and
    disposing at least one end of at least one said bent element in said at least one V-shaped groove.

14. The method according to claim 6, wherein said step of providing at least one bent element comprises providing one element for providing optoelectronic transmission and one element for providing optoelectronic reception.

15. A method of forming apparatus for guiding at least one optical path for an optoelectronic transceiver, said method comprising the steps of providing an input interface;
    providing an output interface; and
    providing at least one waveguide between said input and output interfaces,
    wherein said at least one waveguide is etched from at least one glass sheet;
    wherein said step of providing at least one waveguide further comprises
       providing a silicon wafer; and
       mounting said at least one glass sheet on said silicon wafer,
    wherein said mounting step further comprises providing an adhesive and bonding said at least one glass sheet to said silicon wafer using said adhesive
    adapting said at least one waveguide to provide at least one optical path;
    adapting said at least one waveguide to avoid premature mechanical failure;
    wherein said at least one waveguide includes a bend radius of less than about 2.5 mm.

16. The method according to claim 15, wherein said step of providing at least one waveguide further comprises the step of depositing an etch-masking layer on said at least one glass sheet.

17. The method according to claim 16, wherein said step of providing at least one waveguide further comprises the steps of:
    providing a photoresist layer is over said etch-masking layer;
    exposing and developing said photoresist layer; and
    delineating said etch-masking layer to produce a replica of desired geometry for said at least one waveguide.

18. The method according to claim 17, wherein said etching step further comprises the step of etching said at least one waveguide out of said at least one glass sheet with the aid of the patterned etch-masking layer.

* * * * *

UNITED STATES PATENT AND TRADEMARK OFFICE
CERTIFICATE OF CORRECTION

PATENT NO. : 6,976,792 B1
APPLICATION NO. : 09/670250
DATED : September 26, 2000
INVENTOR(S) : Cohen et al.

It is certified that error appears in the above-identified patent and that said Letters Patent is hereby corrected as shown below:

Column 8, claim 12, line 17, should read --said baking step, related to--

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,976,792 B1 | Page 1 of 1 |
| APPLICATION NO. | : 09/670250 | |
| DATED | : December 20, 2005 | |
| INVENTOR(S) | : Cohen et al. | |

It is certified that error appears in the above-identified patent and that said Letters Patent is hereby corrected as shown below:

Column 8, claim 12, line 17, should read --said baking step, related to--

This certificate supersedes Certificate of Correction issued April 3, 2007.

Signed and Sealed this

Eighth Day of May, 2007

JON W. DUDAS
*Director of the United States Patent and Trademark Office*